3,236,873
1,6-DIMETHANESULFONYL MANNITOL COMPOUNDS
Stanley Sidney Brown and Geoffrey Millward Timmis, London, England, assignors to National Research Development Corporation, London, England, a British corporation
No Drawing. Filed Apr. 8, 1963, Ser. No. 271,499
Claims priority, application Great Britain, Apr. 24, 1958, 13,081/58; Oct. 24, 1958, 34,148/58
3 Claims. (Cl. 260—456)

This invention relates to derivatives of polyhydric alcohols and is a continuation-in-part of our co-pending application Serial No. 805,679 filed April 13, 1959, and now abandoned, for Improvements In or Relating to Derivatives of Polyhydric Alcohols.

The present invention provides the new compounds 1:6-dimethanesulphonyl-mannitol and 1:6-dimethanesulphonyl-2:3:4:5-tetracetyl-mannitol.

The present invention provides a process for the preparation of the new compounds of the invention.

According to the invention 1:6-dimethanesulphonyl-2:3:4:5-tetracetyl-mannitol is produced by treating mannitol with methanesulphonyl chloride in the presence of an acid acceptor which is an organic tertiary base and treating the reaction mixture with acetic anhydride and an acid acceptor which is an organic tertiary base to produce 1:6-dimethanesulphonyl-2:3:4:5-tetracetyl - mannitol. By subjecting the 1:6-dimethanesulphonyl-2:3:4:5-tetracetyl-mannitol to acid hydrolysis, 1:6-dimethanesulphonyl-mannitol is produced.

Preferably the acid acceptor is pyridine or a pyridine derivative.

1:6-dimethanesulphonyl-mannitol and 1:6-dimethane-sulphonyl-2:3:4:5-tetracetyl-mannitol each inhibit completely the growth of the Walker 256 rat tumour at a dose which produces no obvious signs of toxicity. 1:6-dimethanesulphonyl-2:3:4:5-tetracetyl - mannitol is also useful as an intermediate in the preparation of 1:6-dimethanesulphonyl-mannitol.

The following examples illustrate the invention:

Example 1

A stirred solution of 1:2–5:6-dianhydro-3:4-isopropylidene-mannitol (14 g.) (Wiggins, Journal of The Chemical Society, London, 1946, p. 384) in dry ether (100 ml.) was treated at 0° C. with a solution of anhydrous methanesulphonic acid (14.5 g.) in dry ether (50 ml.). When the addition, occupying two minutes, was completed, a clear oil precipitated which after two hours at 0° C. was separated by decantation from the mother liquor. On standing in an open vessel at room temperature for two days, the oil slowly crystallised; it was then triturated with a mixture of ether (50 ml.) and methanol (15 ml.) and the solid so obtained was recrystallised from ethanolic ethyl acetate to give 1:6-dimethanesulphonyl-mannitol (2.6 g.) melting point 133–134° C. (Found: C, 28.3; H, 5.4; S, 19.0. $C_8H_{18}S_2O_{10}$ requires: C, 28.4; H, 5.4; S, 18.95%.)

From the combined mother liquors of these processes a further of 1.4 g. of identical material was obtained.

Example 2

A stirred solution of D-mannitol (36 g., 0.20 mole) in boiling pyridine (200 ml.) was chilled to 3° C. and maintained at this temperature whilst methanesulphonyl chloride (48 g., 0.42 mole) was added dropwise during 2 hours. After a further 3 hours at 5° C., the clear solution was treated with an ice-cold mixture of acetic anhydride (82 g., 0.80 mole) and pyridine (150 ml.) and then left at room temperature for 20 hours. The resulting solution was added slowly, with vigorous stirring to ice-water (1.5 litres); the solid so precipitated was collected, washed, drained and crystallised from a mixture of ethanol and acetone (500 ml.:50 ml.) to give crude 1:4-dimethanesulphonyl - 2:3:4:5 - tetracetyl-D-mannitol (45 g.) M.P. 145–147° C.

This product (21 g.) was boiled under reflux for 1 hour with 0.55 N hydrogen chloride in absolute methanol (800 ml). The solvent was then removed at 20 mm. (during 2 hours), to leave a pale yellow oil, which solidified on desiccation (20 hours) in a vacuum desiccator over sulphuric acid and sodium hydroxide. The solid so obtained was triturated successively with a mixture of methanol and ether (20 ml.:60 ml.), and ethyl acetate (20 ml.) to remove adhering oil and leave crude 1:6-dimethanesulphonyl-D-mannitol (7.5 g.). One crystallisation from ethyl acetate:ethanol (50 ml.:80 ml.) gave the pure product, M.P. 132–3° C.

It will be understood that the present invention includes the optically active compounds, i.e., the stereoisomers, as well as the racemic mixtures.

What is claimed is:
1. A compound selected from the group consisting of 1:6-dimethanesulphonyl-mannitol and 1:6-dimethanesulphonyl-2:3:4:5-tetracetyl-mannitol.
2. 1:6-dimethanesulphonyl-mannitol.
3. 1:6-dimethanesulphonyl - 2:3:4:5-tetracetyl-mannitol.

References Cited by the Examiner
UNITED STATES PATENTS

| 2,404,717 | 7/1946 | Houtz. | |
| 2,726,162 | 12/1955 | Allen et al. | 260—456 X |
| 2,816,125 | 12/1957 | Allen et al. | 260—456 |
| 3,041,241 | 6/1962 | Timmis et al. | 260—456 X |

FOREIGN PATENTS

| 863,496 | 1/1953 | Germany. |

OTHER REFERENCES

Carlson et al., Proc. Soc. Expt'l Biol. Med., vol. 85, pp. 211–13 (1954).
Fletcher et al., J.A.C.S., vol. 74, pp. 3797–3799 (1952).
Haddow et al., Nature, vol. 182, pp. 1164–1165 (1958).
Helferich et al., Ber. Deut. Chem., vol. 71, pp. 712–718 (1938).
Montgomery et al., J. Chem. Soc. (London), vol. 1948, pp. 2204–2208.
Skinner et al., J.A.C.S., vol. 80, pp. 3788–3790 (1958).
Wagner, "Synthetic Organic Chemistry," pp. 169–170, 416–417, 482 and 823 (1953).
Wiggin, J. Chem. Soc. (London), vol. of 1947, pp. 1403–1405.

CHARLES B. PARKER, Primary Examiner.